United States Patent
Shichino (10) Patent No.: US 11,404,921 B2
(45) Date of Patent: Aug. 2, 2022

(54) POWER RECEIVING APPARATUS, POWER TRANSMITTING APPARATUS, CONTROL METHODS THEREOF, AND NON-TRANSITORY COMPUTER-READABLE STORAGE MEDIUM

(71) Applicant: CANON KABUSHIKI KAISHA, Tokyo (JP)

(72) Inventor: Takahiro Shichino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/217,841

(22) Filed: Mar. 30, 2021

(65) Prior Publication Data
US 2021/0313842 A1 Oct. 7, 2021

(30) Foreign Application Priority Data
Apr. 2, 2020 (JP) .............................. JP2020-066955

(51) Int. Cl.
*H02J 50/80* (2016.01)
*H02J 50/10* (2016.01)
*H02J 50/60* (2016.01)

(52) U.S. Cl.
CPC .............. *H02J 50/80* (2016.02); *H02J 50/10* (2016.02); *H02J 50/60* (2016.02)

(58) Field of Classification Search
CPC .............. H02J 7/00032; H02J 7/00034; H02J 2207/40; H02J 50/10; H02J 50/12; H02J 50/60; H02J 50/80
See application file for complete search history.

(56) References Cited

U.S. PATENT DOCUMENTS

| | | | | |
|---|---|---|---|---|
| 2011/0279244 A1* | 11/2011 | Park | ....................... | H02J 50/90 340/10.34 |
| 2012/0212071 A1* | 8/2012 | Miyabayashi | ...... | H04W 52/283 307/104 |
| 2013/0342161 A1* | 12/2013 | Byun | ....................... | H02J 5/005 320/108 |
| 2014/0327409 A1* | 11/2014 | Lee | ....................... | H02J 7/025 320/137 |
| 2016/0118811 A1* | 4/2016 | Eguchi | .................... | H02J 50/10 307/104 |
| 2017/0077743 A1* | 3/2017 | Liu | ....................... | H02J 7/0029 |
| 2018/0138756 A1* | 5/2018 | Bae | ....................... | H04B 5/0037 |
| 2018/0241223 A1* | 8/2018 | Bae | ....................... | H02J 7/025 |

FOREIGN PATENT DOCUMENTS

JP 2017-512454 A 5/2017

* cited by examiner

*Primary Examiner* — Levi Gannon
(74) *Attorney, Agent, or Firm* — Canon U.S.A., Inc. I.P. Division (57) ABSTRACT

A power receiving apparatus comprises a power receiving unit configured to wirelessly receive power from a power transmitting apparatus; and a transmitting unit configured to, in a state where both power reception by the power receiving unit and reception of power transmitted to the power receiving apparatus from an external apparatus via a cable are detected, transmit, to the power transmitting apparatus, information for restricting power transmission for activating the power receiving apparatus, wherein the information being information for restricting power transmission during the period of time from when the power transmission is stopped until a predetermined period has elapsed.

30 Claims, 5 Drawing Sheets

POWER RECEIVING APPARATUS, POWER TRANSMITTING APPARATUS, CONTROL METHODS THEREOF, AND NON-TRANSITORY COMPUTER-READABLE STORAGE MEDIUM

BACKGROUND

Field

The present disclosure relates to a power receiving apparatus, a power transmitting apparatus, control methods thereof, and a non-transitory computer-readable storage medium.

Description of the Related Art

Technology for wireless power transmission systems has been widely developed. Japanese Patent Laid-Open No. 2017-512454 discloses a technique for causing a mobile terminal, which is able to be charged by both wired charging and wireless charging, to not perform wireless charging if wired charging is in progress.

Additionally, a power transmitting apparatus complying with a wireless charging standard defined by WPC (Wireless Power Consortium) (to be referred to as the WPC standard hereinafter) can transmit a small amount of power (an analog ping) in a state in which no object appears to exist in a range within which the power transmitting apparatus can maintain power transmission to a power receiving apparatus. The analog ping can be used to detect an object within range (an active area) of the power transmitting apparatus. If an object is detected by the analog ping, in order to determine whether the object is a power receiving apparatus, the power transmitting apparatus transmits a larger amount of power (a digital ping) for activating a power receiving apparatus, the power for the digital ping being larger than the small amount of power used for the analog ping. Further, if no power receiving apparatus is detected after the digital ping is transmitted or if a power transmission stop instruction is received from a power receiving apparatus (the power receiving apparatus having determined not to perform wireless charging), the power transmitting apparatus stops the transmission of the digital ping. Then, at a later point in time, the power transmitting apparatus again performs the above operations of transmitting the analog ping followed by transmitting the digital ping.

In the above configuration, if a power receiving apparatus that has a function of not performing wireless charging if wired charging is in progress, is placed on the power transmitting apparatus, the power receiving apparatus—if it is already being wire-charged—may determine not to perform wireless charging. Accordingly, the power receiving apparatus may send the power transmitting apparatus a power transmission stop instruction. If this occurs, in the above configuration, it may happen that the power receiving apparatus repeatedly performs an operation of receiving the digital ping and of sending the power transmission stop instruction. Such processing can leads to an unnecessary expenditure of power as power transmission is needessly repeated.

SUMMARY

Various embodiments of the present disclosure provide mechanisms and techniques for suppressing the repetition of unnecessary power transmission.

According to various embodiments of the present disclosure, a power receiving apparatus is provided that includes: a power receiving unit configured to wirelessly receive power from a power transmitting apparatus; and a transmitting unit configured to, in a state where both power reception by the power receiving unit and reception of power transmitted to the power receiving apparatus from an external apparatus via a cable are detected, transmit, to the power transmitting apparatus, information for restricting power transmission for activating the power receiving apparatus, wherein the information being information for restricting power transmission during the period of time from when the power transmission is stopped until a predetermined period has elapsed.

Further features of the present disclosure will become apparent from the following description of exemplary embodiments (with reference to the attached drawings).

DESCRIPTION OF THE EMBODIMENTS

Hereinafter, example embodiments will be described in detail with reference to the attached drawings. Note that the following embodiments are not intended to limit the scope of the claimed disclosure, and the invention is not limited to an invention that requires a combination of all features described in the embodiments. Two or more of the multiple features described in the embodiments may be combined as appropriate. Furthermore, the same reference numerals are given to the same or similar configurations in different drawings, and redundant description thereof is omitted.

<Configuration of Wireless Power Transmission System>

Figure 1:
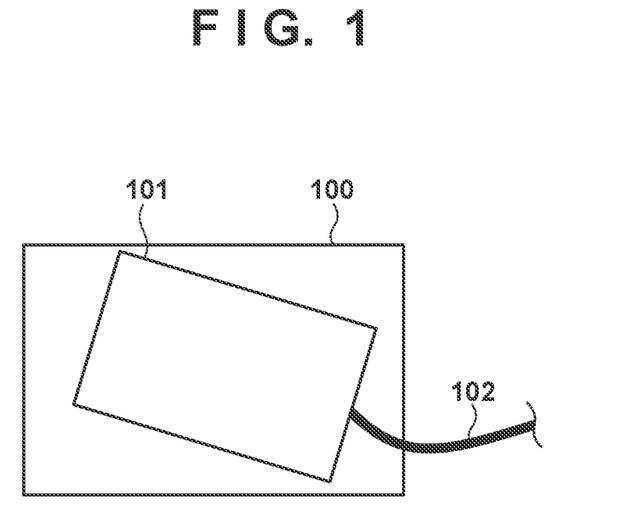
FIG. 1 is an illustration of a view showing the configuration of a wireless power transmission system according to an embodiment.

FIG. 1 is an illustration of a view showing the configuration of a wireless power transmission system according to one embodiment. According to this example embodiment, a system is configured to include an electronic equipment 101 incorporating a power receiving apparatus (details thereof will be described later) and a power transmitting apparatus 100. The power transmitting apparatus 100 transmits power wirelessly to the power receiving apparatus. The electronic equipment 101 is an electronic equipment that charges an internal battery by the power wirelessly received from the power transmitting apparatus 100.

Reference numeral 102 denotes a wired cable connected to the electronic equipment 101. An example of such a wired cable is a USB (Universal Serial Bus) cable, for example. The electronic equipment 101 can charge the internal battery by the power received via the wired cable 102.

<Arrangement of Electronic Equipment Including Power Receiving Apparatus>

Figure 2A:
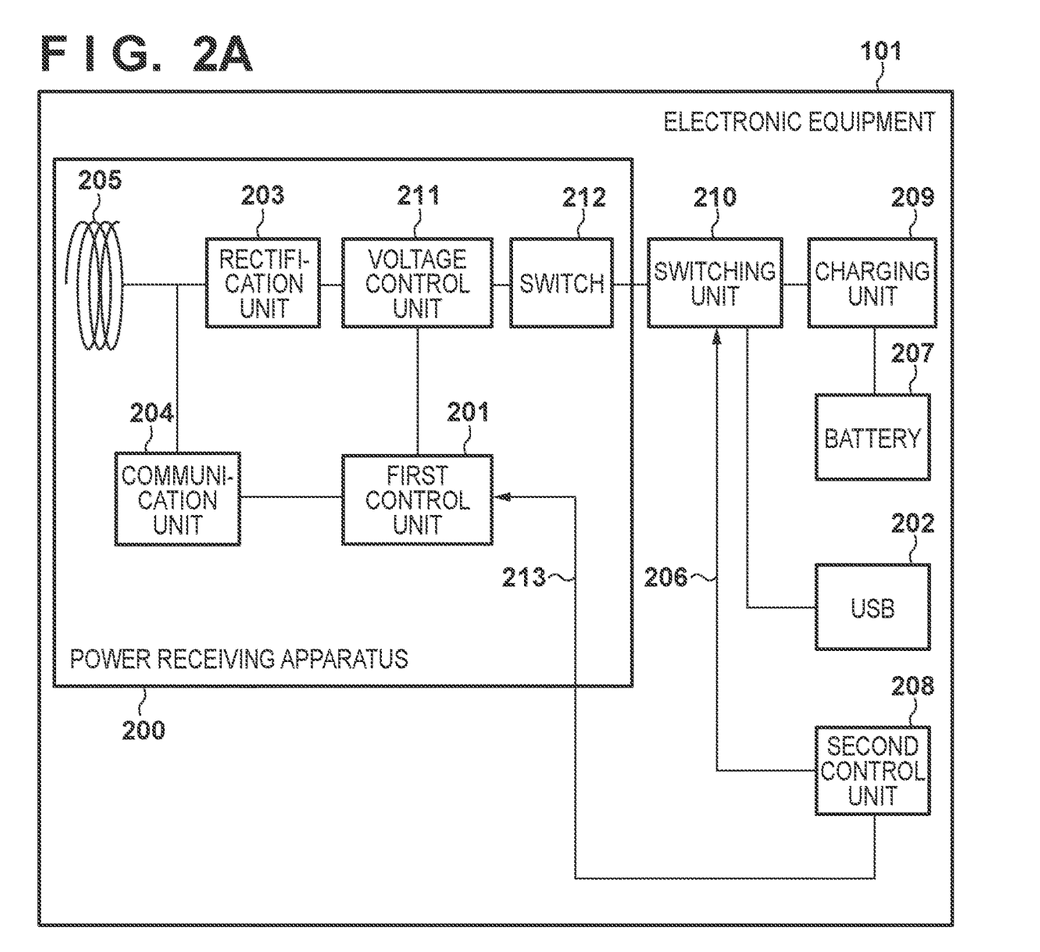
FIG. 2A is a block diagram showing a power receiving apparatus according to the embodiment.

FIG. 2A is a block diagram showing the configuration of a device (electronic equipment 101) that includes a power receiving apparatus 200 according to the present example embodiment. The power receiving apparatus 200 complies with the WPC standard.

The power receiving apparatus 200 includes a first control unit 201, a rectification unit 203, a communication unit 204, a power receiving coil 205, a voltage control unit 211, and a switch 212. Note that the electronic equipment 101 includes the power receiving apparatus 200, a USB 202, a battery 207, a second control unit 208, a charging unit 209, and a switching unit 210. However, the power receiving apparatus 200 may serve as the electronic equipment 101 and include all the components.

The rectification unit 203 converts an AC voltage and an AC current transmitted from the power transmitting apparatus 100 via the power receiving coil 205 into a DC voltage and a DC current, respectively, that are used to operate the first control unit 201, the voltage control unit 211, the charging unit 209, and the like. The rectification unit 203 according to the present embodiment supplies the power used by the charging unit 209 to charge the battery 207.

The communication unit 204 performs control communication of wireless charging based on the WPC standard with a communication unit of the power transmitting apparatus 100. This control communication is implemented by load-modulating the electromagnetic wave received by the power receiving coil 205. The communication unit 204 may use another wireless standard such as Wi-Fi, Bluetooth Low Energy, or NFC (Near Field Communication).

The voltage control unit 211 operates on the DC voltage rectified by the rectification unit 203, and supplies a constant voltage predetermined for the charging unit 209. The switch 212 switches whether to output, via the switching unit 210, the output voltage of the voltage control unit 211 to the charging unit 209 which is a load. The switch 212 is controlled by the first control unit 201. Any ones of the first control unit 201, the rectification unit 203, the communication unit 204, the voltage control unit 211, and the switch 212 are mounted in the same chip as the power receiving IC (power receiving apparatus) 200 corresponding to the WPC standard. The first control unit 201 is configured to include, for example, one or more processors such as a CPU (Central Processing Unit) and an MPU (Micro Processing Unit), and controls the entire power receiving apparatus 200. Note that the first control unit 201 may be configured to include, for example, an ASIC (Application Specific Integrated Circuit), an FPGA (Field Programmable Gate Array), or the like.

The USB 202 is a USB device corresponding to the USB standard, and receives power from a USB host (not shown) via the USB cable 102. Here, the USB 202 may have another arrangement as long as it can perform wired charging of the battery 207. For example, power may be directly received from an AC adapter (not shown) without using the switching unit 210.

The second control unit 208 is configured to include, for example, one or more processors such as a CPU (Central Processing Unit) and an MPU (Micro Processing Unit), and controls the entire electronic equipment 101 incorporating the power receiving IC. Note that the second control unit 208 may be configured to include, for example, an ASIC (Application Specific Integrated Circuit), an FPGA (Field Programmable Gate Array), or the like.

The second control unit 208 is electrically connected to the first control unit 201 via a communication interface 213, and controls the first control unit 201 via the communication interface 213. Hereinafter, for the sake of descriptive convenience, when the second control unit 208 gives an instruction to the first control unit 201, this is simply expressed that the second control unit 208 gives an instruction to the power receiving apparatus 200. The communication interface 213 may be a GPIO (General-Purpose Input/Output) or I2C (Inter-Integrated Circuit) interface.

The switching unit 210 receives, via the switch 212, the wireless power received from the power transmitting apparatus 100. Further, the switching unit 210 receives the power from the USB host via the USB cable 102. Then, the switching unit 210 exclusively selects one of the power received via the switch 212 and the power received via the USB 202, and outputs the selected power to the charging unit 209. Here, the power to be selected is determined based on a selection signal 206 output from the second control unit 208. The switching unit 220 charges the battery 207 via the charging unit 209 which is a load.

Here, the power receiving apparatus 200 may be a camera, a smartphone, a tablet PC, a laptop PC, an automobile, a robot, a medical equipment, or a printer.

Note that some of the components of the electronic equipment 101 located outside the power receiving apparatus 200 may be arranged to be incorporated in the power receiving apparatus 200. To the contrary, some of the components incorporated in the power receiving apparatus 200 may be arranged outside the power receiving apparatus 200 and inside the electronic equipment 101.

<Arrangement of Power Transmitting Apparatus>

Figure 2B:
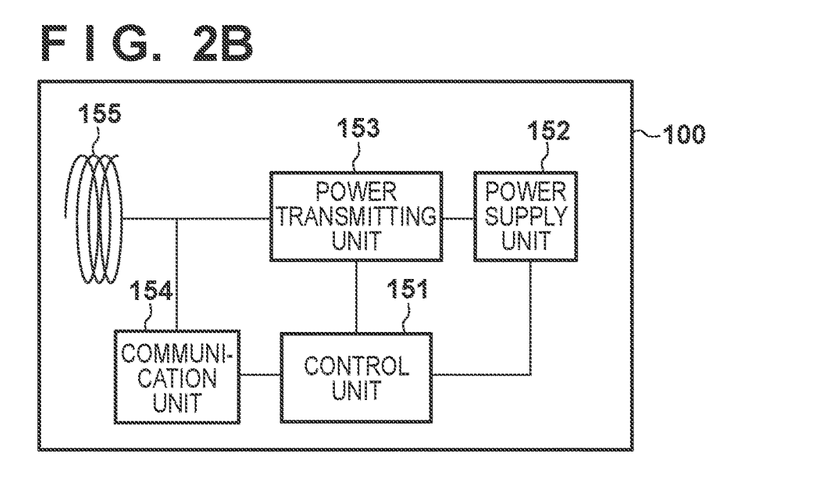
FIG. 2B is a block diagram showing a power transmitting apparatus according to the embodiment.

FIG. 2B is a block diagram showing the arrangement of the power transmitting apparatus 100 according to present embodiment. The power transmitting apparatus 100 complies with the WPC standard. Here, the power transmitting apparatus 100 has an ability of supplying power to the charging unit 209 of the power receiving apparatus 200 complying with the WPC standard just like the power transmitting apparatus 100. In an example, the power transmitting apparatus 100 includes a control unit 151, a power supply unit 152, a power transmitting unit 153, a communication unit 154, and a power transmitting coil 155. The power transmitting apparatus 100 can perform power transmission (for example, an analog ping) for detecting an object without activating the power receiving apparatus 200, and power transmission (for example, a digital ping) for activating the power receiving apparatus 200.

The control unit 151 is configured to include, for example, one or more processors such as a CPU (Central Processing Unit) and an MPU (Micro Processing Unit), and controls the entire power transmitting apparatus 100. Note that the control unit 151 may be configured to include, for example, an ASIC (Application Specific Integrated Circuit), an FPGA (Field Programmable Gate Array), or the like.

The power supply unit 152 is supplied with power for operating the power transmitting apparatus 100 from, for example, an AC adapter (not shown) via a USB cable (not shown), and supplies the power for operating at least the control unit 151 and the power transmitting unit 153.

The power transmitting unit 153 generates an AC voltage and an AC current to be transmitted to the power receiving apparatus 200 via the power transmitting coil 155. For example, the power transmitting unit 153 can convert the DC voltage supplied by the power supply unit 152 into an AC voltage by a switching circuit having a half-bridge or full-bridge configuration using an FET. In this case, the power transmitting unit 153 can include a gate driver that controls ON/OFF of the FET.

The communication unit 154 performs control communication related to control of non-contact charging based on the WPC standard with the power receiving apparatus 200 (communication unit 204 thereof). The communication unit 154 can modulate the AC voltage or current generated by the power transmitting unit 153, and communicate with the power receiving apparatus 200 by communication in which information is superimposed on the wireless power. Note that the present invention is not limited to this, and the communication unit 154 may communicate with the power receiving apparatus 200 by communication in which at least a part of frequency band for communication is not included in the frequency band for power transmission. This communication can be performed by, for example, NFC, RFID, Wi-Fi®, Bluetooth Low Energy, or the like.

Note that the wireless power transmission method, which the power transmitting apparatus 100 and the power receiving apparatus 200 included in the electronic equipment 101 comply with, is not limited to the method defined by the WPC standard, and may be another electromagnetic induction method, a magnetic field resonance method, an electric field resonance method, a microwave method, or a method using a laser or the like. In the present embodiment, the wireless power received by the power receiving apparatus 200 is used for charging the battery 207. However, the wireless power may be used for an application other than charging. A method may be used in which the power output from the rectification unit 203 and the voltage control unit 211 of the power receiving apparatus 200 is not stored in the battery 207 but used to directly drive a circuit (not shown).

Figure 3:
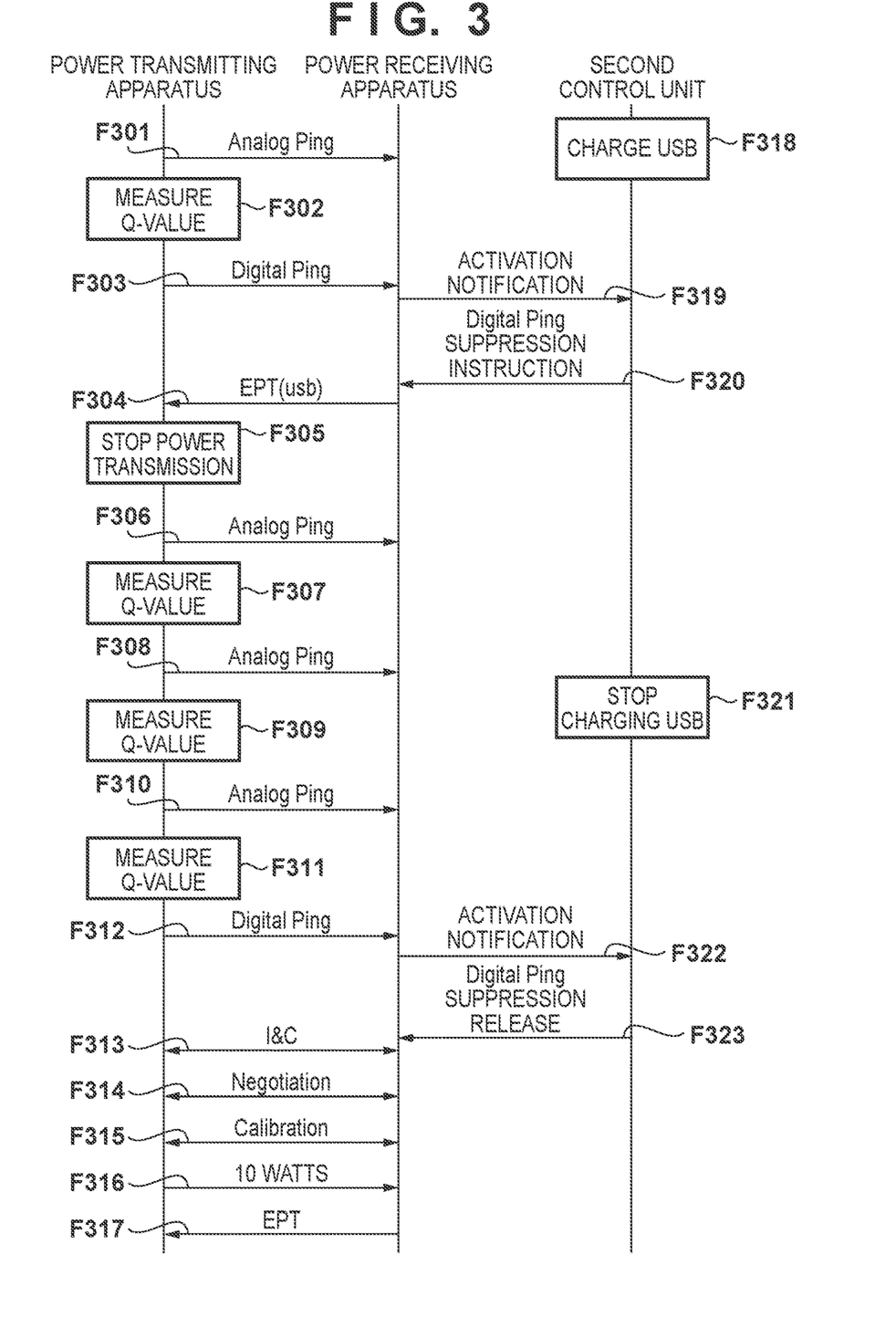
FIG. 3 is a sequence chart of the power transmitting apparatus and the power receiving apparatus according to the embodiment.
Figure 4:
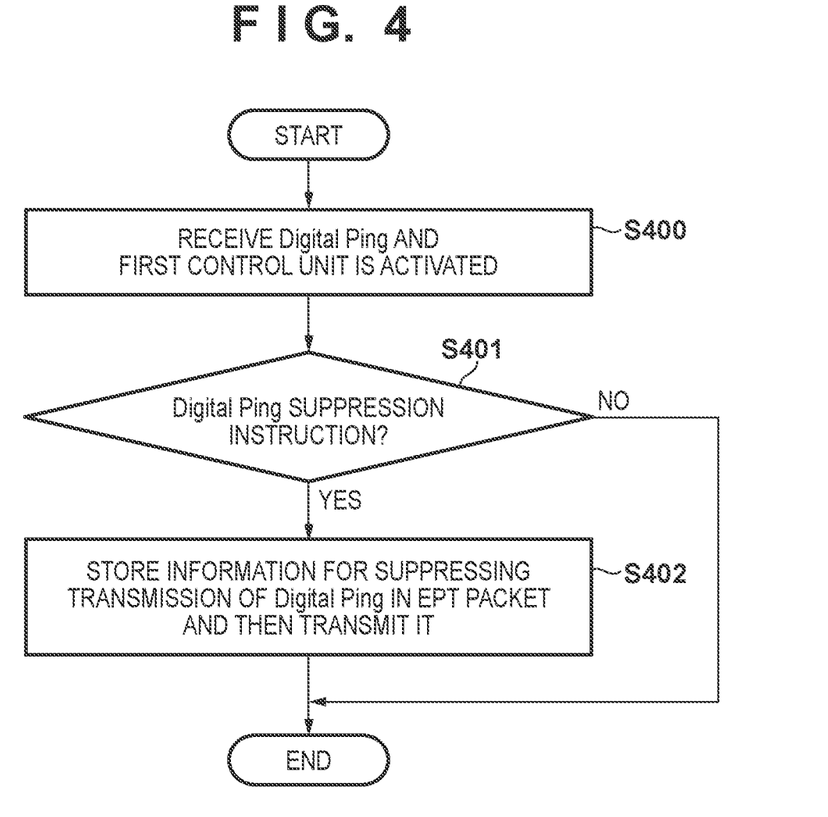
FIG. 4 is a flowchart illustrating the procedure of processing performed by the power receiving apparatus according to the embodiment.
Figure 5:
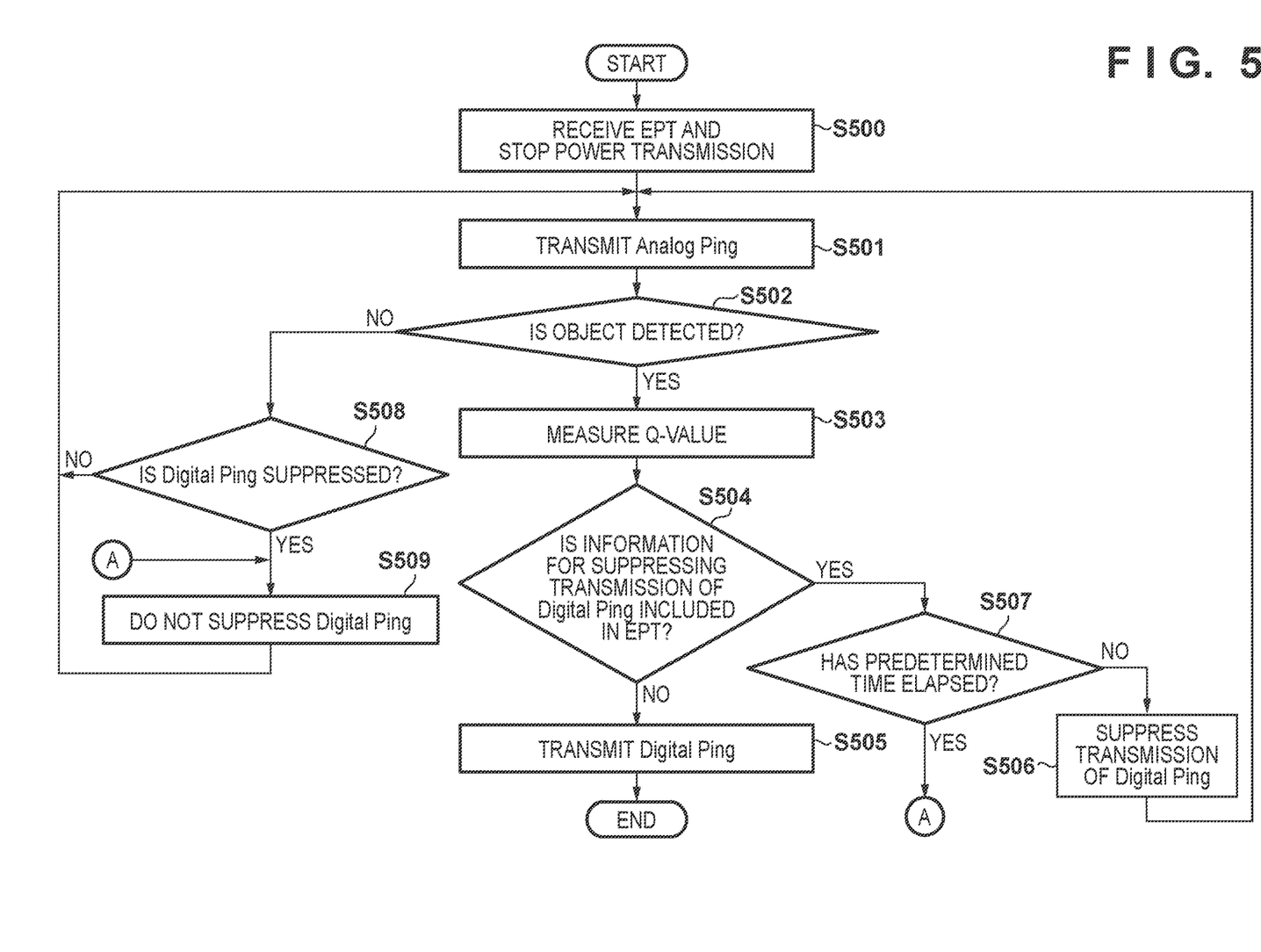
FIG. 5 is a flowchart illustrating the procedure of processing performed by the power transmitting apparatus according to the embodiment.

Next, the processing according to the present embodiment will be described with reference to FIGS. 3 to 5. FIG. 3 is a sequence chart showing the processing that occurs according to the present embodiment, FIG. 4 is a flowchart illustrating the steps of a process performed by the electronic equipment 101 according to the present embodiment, and FIG. 5 is a flowchart illustrating the steps of a process performed by the power transmitting apparatus according to the present embodiment.

<Processing Sequence>

First, with reference to a part of FIG. 3, some operations of the power transmitting apparatus 100 and the electronic equipment 101 (power receiving apparatus 200 and other components) defined by the WPC standard version 1.2.3 will be extracted and described.

If the power transmitting apparatus 100 is activated, it intermittently transmits an analog ping via the power transmitting coil 155 (F301). The analog ping is a small power transmitted to detect the presence of an object without activating the power receiving apparatus 200. While the power transmitting apparatus 100 is transmitting the analog ping, the power transmitting apparatus 100 is in a selection phase.

The power transmitting apparatus 100 detects a fluctuation in voltage value, current value, or resonance frequency of the power transmitting coil 155 upon transmitting the analog ping. If the fluctuation exceeds a certain threshold value, the power transmitting apparatus 100 determines that an object exists near the power transmitting coil 155, and performs Q-value measurement (F302).

The Q-value measurement means measuring the Q value of the power transmitting coil 155. The measured Q value is used in Q value-based foreign object detection, which will be described later. After performing the Q-value measurement, the power transmitting apparatus 100 transitions to a ping phase. The foreign object here is an object different from the power receiving apparatus. For example, the foreign object is an object including a conductor such as a metal piece or an IC (Integrated Circuit) card.

In the ping phase, the power transmitting apparatus 100 transmits a digital ping which is a power larger than the analog ping (F303). The digital ping is power for activating the power receiving apparatus 200, and has a magnitude enough for activating the first control unit 201 of the power receiving apparatus 200 existing near at least the power transmitting coil 155.

If the first control unit 201 is activated by the power received via the power receiving coil 205, the first control unit 201 transitions to a selection phase. Then, the first control unit 201 notifies the power transmitting apparatus 100 of Signal Strength indicating the magnitude of the received voltage, and transitions to an Identification & Configuration phase (to be referred to as an I & C phase F313 hereinafter). If the Signal Strength is received, the power transmitting apparatus 100 transitions to the I & C phase F313.

In the I & C phase, the power receiving apparatus 200 transmits, to the power transmitting apparatus 100, an ID packet including a manufacturer code indicating the manufacturer of the self-apparatus and device identification information, and a configuration packet including the standard version which the self-apparatus complies with, and the like.

The power transmitting apparatus 100 receives the configuration packet. Then, if the corresponding standard version of the power receiving apparatus 200 is a version equal to or higher than a predetermined version (for example, v1.2.2), the power transmitting apparatus 100 transmits, to the power receiving apparatus 200, an ACK indicating that the information included in the configuration packet has been acknowledged. Then, the power transmitting apparatus 100 transitions to a negotiation phase F314.

Similarly, if the ACK is received, the power receiving apparatus 200 transitions to the negotiation phase F314.

In the negotiation phase, the power transmitting apparatus 100 and the power receiving apparatus 200 perform negotiation of various types of parameters including negotiation to determine Guaranteed Power (to be referred to as "GP" hereinafter) indicating the magnitude of power that the power receiving apparatus 200 can surely receive.

Further, in the negotiation phase, the power receiving apparatus 200 transmits, to the power transmitting apparatus 100, information related to a Q value-based foreign object detection function. More specifically, the Q value of the power transmitting coil of the power transmitting apparatus at the time of placing the power receiving apparatus 200 on the power transmitting apparatus defined by the WPC standard is stored in an FOD (Foreign Object Detection) status packet (to be referred to as an FOD packet hereinafter) and transmitted to the power transmitting apparatus 100.

If the FOD packet is received, the power transmitting apparatus 100 determines, based on the Q value measured in F302 and the Q value stored in the FOD packet, whether a foreign object exists in a range where the power transmitting apparatus 100 can maintain power transmission to the power receiving apparatus 200.

Subsequently, the power transmitting apparatus 100 and the power receiving apparatus 200 perform calibration processing related to a power loss (a difference between the transmitted power and the received power)-based foreign object detection function (F315).

If the calibration processing is completed, the power transmitting apparatus 100 and the power receiving apparatus 200 transition to a power transfer phase. Here, the power receiving apparatus 200 receives a power of 10 W from the power transmitting apparatus 100 (F316).

If charging of the battery 207 is completed, the power receiving apparatus 200 transmits, to the power transmitting apparatus 100, an end power transfer packet (to be referred to as an EPT hereinafter) requesting to stop the power transmission (F317), and a sequence of processing is completed.

<Processing Sequence when USB Charging is in Progress Before Wireless Charging>

Next, with reference to a part of FIG. 3 again, a sequence will be described which is performed when USB charging is performed before wireless charging, that is, when wireless power is received during wired reception of power. In FIG. 3, if charging by the USB 202 is started, the second control unit 208 recognizes the USB charging (F318).

The power transmitting apparatus 100 transmits an analog ping (F301). Thereafter, if the power receiving apparatus 200 is placed on the power transmitting apparatus 100 and the power transmitting apparatus 100 detects an object, the power transmitting apparatus 100 performs Q-value detection (F302), and transmits a digital ping (F303).

If the power receiving apparatus 200 receives the digital ping and is activated (F303), the power receiving apparatus 200 notifies the second control unit 208 of the activation via the communication interface 213 (F319).

If the notification of the activation is received, the second control unit 208 recognizes that the power receiving apparatus 200 has been activated. At this time, the second control unit 208 is already performing USB charging. Therefore, in order to prevent heat generation in the power transmitting coil 155 and the internal circuit caused by repetitive reception of the digital ping, the second control unit 208 gives a digital ping suppression instruction to the power receiving apparatus 200 (F320). Here, the digital ping suppression instruction is an instruction for instructing the power transmitting apparatus 100 not to transmit the digital ping for a predetermined time.

If the digital ping suppression instruction is received, the power receiving apparatus 200 transmits an "EPT (USB)" to the power transmitting apparatus 100 (F304). The EPT (USB) is a packet serving as an information element of the EPT packet and used to stop power transmission because wired charging is in progress or supplying a wireless power to the charging circuit may cause an overvoltage in the load (charging circuit). Further, the EPT (USB) is a packet storing information indicating that power reception via the USB 202 is in progress. That is, AAA of the "EPT (AAA)" corresponds to information indicating the reason for stopping the power transmission.

If the EPT (USB) packet is received, the power transmitting apparatus 100 suppresses the transmission of the digital ping for the predetermined time.

If the power transmitting apparatus 100 stops the transmission of the digital ping (F305), it transmits the analog ping (F306).

In this example, since the power receiving apparatus 200 is left placed on the power transmitting apparatus 100 and the power transmitting apparatus 100 detects an object by the analog ping, Q-value measurement is performed (F307). Here, the power transmitting apparatus 100 is requested by the EPT (USB) packet to suppress the transmission of the digital ping. Therefore, even if an object is detected by the analog ping, the power transmitting apparatus 100 does not transmit the digital ping for the predetermined time, and repeats transmission of the analog ping and the Q-value detection (F308 and F309). Here, since the analog ping is a very small power compared with the digital ping and cannot activate the power receiving apparatus 200, it does not cause heat generation as in the case of the digital ping. Alternatively, even if heat generation occurs, heat generation as in the case of the digital ping does not occur.

Here, assume that the USB cable 102 is disconnected from the electronic equipment 101 including the power receiving apparatus 200, and the USB charging is stopped. Then, the second control unit 208 recognizes that the USB charging was stopped (F321).

Thereafter, the power transmitting apparatus 100 transmits the analog ping and performs Q-value detection (F310 and F311). Here, assume that the predetermined time has elapsed. Then, the power transmitting apparatus 100 transmits the digital ping (F312). The power receiving apparatus 200 receives the digital ping and is activated. Since the power receiving apparatus 200 is activated by receiving the digital ping, it gives an activation notification to the second control unit 208 (F322).

Since the second control unit 208 has recognized in F321 that the USB charging was stopped, it can determine that no heat generation by the USB charging will occur. Accordingly, the second control unit 208 determines that charging by a wireless power is allowed, and gives a digital ping suppression release instruction to the power receiving apparatus 200 (F323).

If the digital ping suppression release instruction is received, the power receiving apparatus 200 does not transmit an EPT (USB) packet, and receives wireless power from the power transmitting apparatus 100 in accordance with the above-described sequence of the I & C phase (F313), the negotiation phase (F314), the calibration processing (F315), and the power transfer phase (F316) to charge the battery 207. If the charging of the battery 207 is completed, an EPT packet is transmitted to the power transmitting apparatus 100 (F317).

<Processing of Power Receiving Apparatus>

Next, FIG. 4 illustrates, out of the processing of the power receiving apparatus 200 according to the present embodiment, the procedure of processing of determining whether to cause the power transmitting apparatus 100 to suppress the transmission of the digital ping. If the digital ping is received and the first control unit 201 is activated (step S400), the power receiving apparatus 200 checks, via the communication interface 213, whether a digital ping suppression instruction has been received from the second control unit 208 (step S401). Here, if the digital ping suppression instruction has been received (YES in step S401), the power receiving apparatus 200 stores information for suppressing the transmission of the digital ping in an EPT packet and transmits it to the power transmitting apparatus 100 (step S402). On the other hand, if no digital ping suppression instruction has been received (NO in step S401) or if a digital ping suppression release instruction (F323) has been received, the processing is terminated.

<Processing of Power Transmitting Apparatus>

FIG. 5 illustrates, out of the processing of the power transmitting apparatus according to the present embodiment, the procedure of processing related to suppression of the transmission of the digital ping.

If the EPT is received and the power transmission is stopped (step S500), the power transmitting apparatus 100 transmits an analog ping (step S501). Then, the power transmitting apparatus 100 determines whether an object is detected by the analog ping (step S502). If an object is detected (YES in step S502), Q-value measurement is performed (step S503). Subsequently, the power transmitting apparatus 100 determines whether the EPT packet received in step S500 includes information for suppressing the transmission of the digital ping (step S504). If the information is included (YES in step S504), the power transmitting apparatus 100 determines whether the predetermined time has elapsed since the transmission of the digital ping was suppressed (step S507). If the predetermined time has not elapsed (NO in step S507), the power transmitting apparatus 100 determines to suppress the transmission of the digital ping (step S506), and transmits the analog ping again (step S501). This corresponds to the sequence from F306 to F308 described above.

On the other hand, if the predetermined time has elapsed since the transmission of the digital ping was suppressed (YES in step S507), the power transmitting apparatus 100 determines not to suppress the transmission of the digital ping any more (step S509), and transmits the analog ping (step S501). Thereafter, if the power receiving apparatus 200 is detected in object detection (YES in step S502), Q-value measurement is performed (step S503), step S504 is skipped, and the digital ping is transmitted (step S505). This corresponds to the sequence from F310 to F312 described above, and the power receiving apparatus 200 can rapidly charge the battery 207 by a wireless power.

After an object is detected (YES in step S502) and step S503 is performed, if the EPT includes no information for suppressing the transmission of the digital ping (NO in step S504), the power transmitting apparatus 100 transmits the digital ping (step S505).

If no object is detected in step S502 (NO in step S502), even if the transmission of the digital ping is being suppressed (YES in step S508), it is controlled so as not to suppress the transmission of the digital ping (step S509). With this processing, if the next time an object is detected (YES in step S502), the digital ping can be rapidly transmitted (step S505) without waiting for the lapse of the predetermined time (YES in step S507).

With this processing, in a case in which the transmission of the digital ping has been suppressed since USB charging was in progress but the power receiving apparatus 200 on the power transmitting apparatus 100 is removed and another power receiving apparatus is placed on the power transmitting apparatus 100, it is possible to rapidly charge a battery of the other power receiving apparatus using a wireless power without waiting for the lapse of the predetermined time.

<Processing Sequence when Charging by Wireless Power is in Progress Before USB Charging>

In FIG. 3, the processing sequence in a case in which USB charging is in progress before wireless charging has been described, but the processing according to the present embodiment is also applicable to a case in which charging by a wireless power is in progress before USB charging, that is, a case in which wired reception of power occurs during wireless reception of power.

For example, when the power receiving apparatus 200 is performing charging by a wireless power based on the sequence from F310 to F316, if the energized (power-suppliable) USB cable 102 is inserted to the electronic equipment 101 including the power receiving apparatus 200, the second control unit 208 gives a digital ping suppression instruction to the power receiving apparatus 200 in accordance with the above-described processing from F318 to F320. After that, based on the processing described above, the power receiving apparatus 200 can cause the power transmitting apparatus 100 to suppress the transmission of the digital ping. The power transmitting apparatus 100 can suppress the transmission of the digital ping.

As has been described above, if the power transmitting apparatus 100 detects an object by the analog ping during USB charging, the transmission of the digital ping by the power transmitting apparatus 100 is suppressed for the predetermined time. In addition, if the USB cable 102 is inserted during charging by a wireless power, the transmission of the digital ping by the power transmitting apparatus 100 is suppressed for the predetermined time. Thus, heat generation in the power receiving apparatus caused by the digital ping can be prevented.

Particularly, as has been described in F318, F320, F322, and F323, the second control unit 208 recognizes if USB charging is in progress or USB charging has been stopped and, based on the recognition result, gives the digital ping suppression instruction or the digital ping suppression release instruction to the power receiving apparatus 200. Then, as has been described with reference to FIG. 4, in accordance with the instruction, the power receiving apparatus 200 determines whether to transmit, to the power transmitting apparatus 100, the information for suppressing the transmission of the digital ping. With this processing, if USB charging is in progress or if the USB cable is inserted, the power receiving apparatus 200 can avoid heat generation by suppressing the transmission of the digital ping; otherwise, the power receiving apparatus 200 does not cause the suppression, so that it can rapidly receive wireless power and charge the battery 207.

Then, as has been described above with reference to FIG. 5, based on whether the information for suppressing the transmission of the digital ping is received and whether the predetermined time has elapsed since the suppression was started, the power transmitting apparatus 100 suppresses the transmission of the digital ping or releases the transmission suppression of the digital ping. With this processing, if the placed power receiving apparatus is being USB-charged or if the USB cable is inserted, the transmission of the digital ping is suppressed to avoid heat generation; otherwise, a wireless power is rapidly transmitted to enable the power receiving apparatus 200 to charge the battery 207.

The present embodiment has been described using the EPT (USB) as an example of storing the information for suppressing the digital ping in a packet, that is the EPT packet, for suppressing the power transmission because wired power reception is in progress or supplying a wireless power to the charging circuit may cause an overvoltage in the load (charging circuit). However, an "EPT (Wired)", which means that wired power reception is in progress, may be used in other embodiments. Alternatively, an "EPT (AC adaptor)", which means that power reception from an AC adaptor is in progress, may be used in some other embodiments.

Further, as the packet for suppressing the transmission of the digital ping, an "EPT (Restart)" may be used. Here, "EPT (Restart)" means that the transmission of the digital ping is restarted after a predetermined time has elapsed since the power transmission was stopped. This predetermined time is a fixed time, and cannot be negotiated in the negotiation phase. Note that in this case, AAA of the "EPT (AAA)" is not information indicating a reason for stopping the power transmission but information indicating the phase to restart the power transmission after the power transmission was stopped or a time required before restarting the power transmission. The fixed time may be, for example, a time defined in the standard, or a time preset by the manufacturer of the power transmitting apparatus. Alternatively, the time may be set by the user.

Furthermore, as the packet for suppressing the transmission of the digital ping, for example, an "EPT (Code X)" may be used. Here, the "EPT (Code X)" is information meaning that the transmission of the digital ping is restarted after a predetermined time has elapsed since the power transmission was stopped. In a case of the EPT (Code X), a time negotiated in advance in the negotiation phase is used as the predetermined time. Note that a time indicated by the user may be determined by negotiation. However, the predetermined time may not be necessarily determined by negotiation, and a fixed value may be used.

Note that for each reason for stopping the power transmission, the predetermined time may be determined in advance or determined by negotiation. If the power transmission is stopped because charging via the USB cable is in progress, the predetermined time may be different from those for other reasons (for example, a case in which an object is detected, and a case in which the temperature is equal to or higher than a threshold value). For example, the predetermined time may be set longer for the case of charging via the USB cable than for the case of other reasons.

The predetermined time during which the power transmission is restricted may be included in the information transmitted from the power receiving apparatus to the power transmitting apparatus, that is, the information for suppressing the transmission of the digital ping.

Note that in the above description, the power transmitting apparatus 100 performs object detection by the analog ping after the transmission of the digital ping is suppressed. However, the similar effect can be obtained even by object detection by the Q value. More specifically, if the power transmitting apparatus 100 stores the Q value obtained when no object is placed thereon, it can perform object detection by comparing the result of Q-value measurement and the stored Q value.

The second control unit 208 may be operated by power supplied from the USB 202. Compared with a case in which the second control unit 208 is operated by power supplied from the battery 207, the second control unit 208 can operate even if the battery is low.

In this case, if USB charging is stopped (F321), the second control unit 208 cannot give the digital ping suppression release instruction (F323). However, then, the power receiving apparatus 200 may determine that the digital ping suppression release instruction is given if no digital ping suppression release instruction is received even after a predetermined time has elapsed since the activation notification was transmitted (F322). The second control unit 208 may be incorporated in the USB 202.

At least a part of processing illustrated in each of the flowcharts of FIGS. 4 and 5 may be implemented by hardware. If the processing is implementing by hardware, for example, a dedicated circuit may be automatically generated, by using a predetermined compiler, on an FPGA from a program for implementing each step. FPGA is an abbreviation for Field Programmable Gate Array. Alternatively, a gate array circuit may be formed as in the case of the FPGA, and implemented as hardware.

As has been described above, in the present embodiment, if both power (digital ping) wirelessly transmitted from the power transmitting apparatus and power (for example, USB charging) transmitted via a wired cable are detected, information (for example, EPT) for causing the power transmitting apparatus to stop the power transmission and information (for example, information stored as the EPT (USB) in the EPT packet) for suppressing predetermined power transmission for activating the power receiving apparatus after the power transmitting apparatus has stopped the power transmission are transmitted to the power transmitting apparatus. With this processing, repetitive transmission of the digital ping can be reduced. Further, reception of the digital ping repeatedly transmitted can be reduced, so that heat generation in the power receiving apparatus can be prevented.

Note that in the embodiment described above, the power transmitting apparatus may restrict the transmission of the analog ping. Restricting the transmission of the analog ping naturally leads to restricting the digital ping. If the transmission of the analog ping is restricted by the power transmitting apparatus, unnecessary power transmission is suppressed. Therefore, the power consumption of the power transmitting apparatus can be reduced. The power receiving apparatus may be configured to transmit, to the power transmitting apparatus, information for restricting the transmission of the analog ping instead of the information for restricting the transmission of the digital ping. Alternatively, the power receiving apparatus may transmit the information for restricting the transmission of the digital ping, but the power transmitting apparatus may restrict the transmission of the analog ping for a predetermined time.

In an arrangement in which the digital ping is restricted but the transmission of the analog ping is not restricted, it is possible to detect removal of the power receiving apparatus. It may be configured such that the restriction of the digital ping is released if removal of the power receiving apparatus is detected. More specifically, the power transmitting apparatus is set so as to be capable of restarting the transmission of the digital ping without waiting for the lapse of the predetermined time. With this configuration, even if the power receiving apparatus is removed and another power receiving apparatus is placed thereafter, this can be detected by the analog ping and the digital ping can be immediately transmitted. Therefore, a delay in timing of starting charging of the other power receiving apparatus can be reduced.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While various embodiments of the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-066955, filed Apr. 2, 2020, which is hereby incorporated by reference herein in its entirety.

What is claimed is:

1. A power receiving apparatus comprising:
a power receiving unit configured to wirelessly receive power from a power transmitting apparatus; and
a transmitting unit configured to, in a state where both power reception by the power receiving unit and reception of power transmitted to the power receiving apparatus from an external apparatus via a cable are detected, transmit, to the power transmitting apparatus, information for restricting power transmission, the information including information for specifying a period during which the power transmission is restricted.

2. The apparatus according to claim 1, wherein
in a case where power reception via the cable is detected when the power reception by the power receiving unit is being performed, the transmitting unit transmits the information.

3. The apparatus according to claim 1, wherein
in a case where the power reception by the power receiving unit is detected when the power reception via the cable is being performed, the transmitting unit transmits the information.

4. The apparatus according to claim 1, wherein
in a case where power transmission for activating the power receiving apparatus is received when the power reception via the cable is being performed, the transmitting unit transmits the information.

5. The apparatus according to claim 1, wherein
the information includes information for restarting power transmission for activating the power receiving apparatus.

6. The apparatus according to claim 5, wherein
the power transmission for activating the power receiving apparatus is transmission of a digital ping according to a WPC standard.

7. The apparatus according to claim 1, wherein
the information is transmitted using an EPT (End Power Transfer) packet according to a Wireless Power Consortium (WPC) standard.

8. The apparatus according to claim 7, wherein
the information is stored as an information element in the EPT packet.

9. The apparatus according to claim 1, wherein
the information is transmitted using a restart packet according to a WPC standard.

10. The apparatus according to claim 1, wherein
the period is determined in a negotiation phase according to a WPC standard.

11. The apparatus according to claim 1, wherein
the information includes information indicating for specifying that power reception via a cable is in progress.

12. The apparatus according to claim 11, wherein
the information for specifying that power reception via a cable is in progress includes information for specifying that power reception by USB (Universal Serial Bus) is in progress.

13. The apparatus according to claim 1, further comprising:
another power receiving unit configured to receive power transmitted from the external apparatus via a cable; and
a supply unit configured to supply, to a load, one of the power received by the power receiving unit and the power received by said another power receiving unit,
wherein, in a case where both the power reception by the power receiving unit and the reception of the power transmitted from the external apparatus via the cable are detected, the supply unit supplies, to the load, the power received by said another power receiving unit.

14. The apparatus according to claim 1, wherein
the period is determined by negotiation with the power transmitting apparatus.

15. The apparatus according to claim 1, wherein
the period is determined by a user.

16. The apparatus according to claim 1, wherein
the period is determined by a WPC standard.

17. The apparatus according to claim 1, wherein
the period is a time preset by a manufacturer of an apparatus.

18. The apparatus according to claim 1, wherein
the period is different from a period of power transmission that is restricted in a case in which an object different from the power receiving apparatus is detected.

19. The apparatus according to claim 1, wherein
the period is longer than a period of power transmission that is restricted in a case in which an object different from the power receiving apparatus is detected.

20. The apparatus according to claim 1, wherein
the external apparatus is different from the power transmitting apparatus.

21. A control method of a power receiving apparatus comprising a power receiving unit configured to wirelessly receive power from a power transmitting apparatus, the method comprising:
in a state where both power reception by the power receiving unit and reception of power transmitted to the power receiving apparatus from an external apparatus via a cable are detected, transmitting, to the power transmitting apparatus, information for restricting power transmission, the information including information for specifying a period during which the power transmission is restricted.

22. A non-transitory computer-readable storage medium storing a computer program for causing a computer to perform a control method of a power receiving apparatus comprising a power receiving unit configured to wirelessly receive power from a power transmitting apparatus, the method comprising:
in a state where both power reception by the power receiving unit and reception of power transmitted to the power receiving apparatus from an external apparatus via a cable are detected, transmitting, to the power transmitting apparatus, information for restricting power transmission, the information including information for specifying a period during which the power transmission is restricted.

23. A power transmitting apparatus, comprising:
a power transmitting unit configured to wirelessly transmit power to a power receiving apparatus;

a receiving unit configured to receive information from the power receiving apparatus; and a control unit configured to, in a case where the receiving unit receives, from a power receiving apparatus power transmitted from the power transmitting unit and power transmitted from an external apparatus via a cable, information including information for specifying a period during which the power transmission is restricted, restrict power transmission via the power transmitting unit during the period specified based on the received information.

24. The apparatus according to claim 23, wherein the control unit is configured to cause the power transmitting unit to perform power transmission for detecting an object during the period specified based on the received information.

25. The apparatus according to claim 24, wherein the power transmission for detecting the object is a transmission of an analog ping according to a WPC standard.

26. The apparatus according to claim 23, wherein in a case where an object is not detected during the period specified based on the received information, the control unit causes the power transmitting unit to perform a power transmission for activating a power receiving apparatus without waiting for a lapse of the period specified based on the received information.

27. The apparatus according to claim 23, wherein the control unit restricts power transmission for detecting an object performed by the power transmitting unit during the period specified based on the received information.

28. The apparatus according to claim 23, wherein the external apparatus is different from the power transmitting apparatus.

29. A control method of a power transmitting apparatus that comprises a power transmitting unit configured to wirelessly transmit power to a power receiving apparatus, the method comprising:

receiving information from the power receiving apparatus; and in a case where the power transmitting apparatus receives information from a power receiving apparatus receiving power transmitted from the power transmitting unit and power transmitted from an external apparatus via a cable, the information including information for specifying a period during which the power transmission is restricted, controlling so as to restrict power transmission via the power transmitting unit during the period specified based on the received information.

30. A non-transitory computer-readable storage medium storing a computer program for causing a computer to perform a control method of a power transmitting apparatus that comprises a power transmitting unit configured to be able to perform power transmission for activating a power receiving apparatus and wirelessly transmits a power to the power receiving apparatus, the method comprising:

receiving information from the power receiving apparatus; and in a case where the power transmitting apparatus receives information from a power receiving apparatus receiving power transmitted from the power transmitting unit and power transmitted from an external apparatus via a cable, the information including information for specifying a period during which the power transmission is restricted, controlling so as to restrict power transmission via the power transmitting unit during the period specified based on the received information.

* * * * *